UNITED STATES PATENT OFFICE.

ARTHUR STOLL, OF BASEL, SWITZERLAND, ASSIGNOR TO CHEMICAL WORKS FORMERLY SANDOZ, OF BASEL, SWITZERLAND.

HIGHLY-ACTIVE PREPARATION OF ERGOT AND PROCESS OF MAKING SAME.

1,394,233. Specification of Letters Patent. Patented Oct. 18, 1921.

No Drawing. Application filed April 11, 1919. Serial No. 289,422.

*To all whom it may concern:*

Be it known that I, ARTHUR STOLL, Phil. Dr., a citizen of the Swiss Republic, and resident of Basel, Switzerland, have invented a new and useful Highly-Active Preparation of Ergot and a Process of Making Same, for which I have filed applications in Switzerland April 9, 1918, and March 10, 1919, of which the following is a full, clear, and exact specification.

The object of the invention is to prepare a highly active preparation of the therapeutically valuable alkaloids contained in the ergot and especially of the alkaloidic main carrier of the ergot in a hitherto unknown pure and crystalline form by employing agents of moderate chemical reactive properties in a technically simple and new process.

I have found that by a careful previous treatment of the ergot with acid reagents, as for instance, dilute acids or solutions of acid salts, the basic substances of the ergot can be fixed in the insoluble cellulous substance in such a manner that they become insoluble in a series of organic solvents. It allows to employ for the degreasing of the ergot besides of the solvents heretofore employed for this purpose, as for instance, benzin, also such solvents of fatty bodies as for instance ether, benzene and the like, which would extract, besides the fatty oil, phytosterin, pharmacologically dangerous acid admixtures and the like, also the therapeutically valuable alkaloids, when the previous acidifying of the ergot would not have taken place. The soluble admixtures of the alkaloids are therefore completely eliminated by an exhaustive extraction of the ergot previously treated with the acid reagents. Hereafter alkaline substances as for instance alkalis or alkali salts are carefully added to the material suspended in the grease solvent until it shows an alkaline reaction, whereby the alkaloids are liberated, and these latter are then extracted and thus obtained in a form free of odd admixtures. The resulting extract is concentrated in vacuo; either it is evaporated to dryness at ordinary temperature, the remaining residue is treated with petroleum ether or benzin and the raw bases not dissolved by the latter are crystallized from ether, or the raw bases are allowed to separate in a crystalline form from the extract concentrated to a small volume and the crystalline product thus obtained is dissolved in indifferent organic solvents mixable with water, as for instance methyl alcohol, ethyl alcohol and acetone, and from the solution thus obtained the pure principal alkaloid of the ergot is allowed to separate again in the form of large, light refracting crystals. The crystallization can be accelerated and completed by adding some water to the solution prepared with the organic solvent free of water.

By isolating the alkaloids from otherwise prepared extracts of ergot, the latter are subjected to the treatment with acid reagents in presence of natural cellulous substance, for instance of powder of dried leaves, whereafter the exhaustive previous extraction and the isolation of the alkaloid preparation are carried out as stated for the treatment of ergot itself.

The new crystalline pure product obtained from ergot according to the new process differs considerably by its properties from the heretofore described crystallized ergotinin [(Tanret, *Comptes-Rendus de l'Académie des Sciences*) 81,896, (1875), 86,888 (1878), *Annales de Chimie et de Physique* (V) 17,493 (1879) Kraft, *Arch. Pharm.* 244,336 (1906) and Barger *Journ. Chem. Soc.* 91,337 (1907) and 97,284 (1910)]; it approaches to the hydroergotinin (Kraft l. c.) or the ergotoxin (Barger l. c.) by many physical and chemical properties and by its physiological action, but differs from the said hydroergotinin of Kraft and the said ergotoxin of Barger, heretofore obtained merely in an amorphous state, namely by its capacity of crystallizing and particularly by its characteristical crystallization from acetone containing a little water. The new substance crystallizes therefrom in white pure, light strongly refracting, rhombic tablets and prisms, which become disintegrated by their drying *in vacuo* at ordinary temperature or by their heating at 50° C. at ordinary pressure and loses $\frac{1}{5}$ of their weight until the weight constancy is attained; the solvent of the crystals which escapes hereby consists of water and of acetone in a single molecular proportion. By drying the substance, it becomes very easily soluble in acetone and recrystallizes quickly therefrom by adding some water as crystals containing the solvent. The product dried to the weight constancy begins to become brown when it is quickly heated to 140-150° C., sinters at 166 to 168° C. while it becomes black and becomes viscous at 170 to 173° C. while a gas development takes place. It contains 11½ per cent. nitrogen and shows a feeble positive rotation. The alkaloid is a strongly unsaturated body and very sensitive to chemical actions; its solutions are colorless and show no fluorescence, but become, like the solid substance, dark colored under the influence of the light in presence of oxygen.

*Example 1.*

2 kilos of ergot are ground in grains of a size of 1 cmm. and mixed throughout with a solution of 60 gr. of crystallized oxalic acid in half a liter of tepid water. The grinding of the moist drug is then continued until a great fineness is obtained whereafter the ground mass is introduced into 5 liters of ether. The mass is abandoned to itself for several hours and hereby temporarily stirred, whereafter the deep-orange colored liquid, containing the principal part of fatty oil and of other neutral and acid substances, is separated by filtration and suction and the residue remaining on the filter washed in the course of 2 hours with about 3 to 4 liters of ether in portions of half a liter. A more complete degreasing is produced hereafter by a subsequent percolation with 4 liters of ether. After a short suction of the ether from the fine, now more clear drug dust, this latter is suspended again in ether, to which about 5% ethyl alcohol have been added, and into this suspension is gradually introduced a cold solution of 200 to 220 gr. of crystallized barium hydroxid in ¾ liters of water while stirring energetically, whereby a uniform weakly alkaline reaction is obtained, no free alkali being present, which would be able to destroy the alkaloids dissolved for the most part in the ether containing alcohol. After about 2 hours the mass is filtered and the feebly yellowish colored extract in ether is separated by suction. A little sample (for example 1 ccm.) shows, after the ether has been driven away and the remaining extract has been dissolved in glacial acetic acid, a very intensive reaction of Keller when iron chlorid is added, if a very good ergot has been employed as parent material. This reaction becomes gradually weaker after the extract has been washed with about 4 liters of solvent sucked slowly through the extract lay in the course of 2 or 3 hours in portions of half a liter, and can finally be observed plainly only with large samples. The extract of alkaloid in ether is evaporated immediately to about ½ to ¾ liter and, after it has been decanted from the precipitates free of alkaloids, it is evaporated to dryness *in vacuo*, below 30° C. For the separting of small quantities of admixtures of fatty bodies and of phytosterin, the light yellow residue is treated with half a liter of petroleum ether or benzin and after the filtration the residue of the raw alkaloids dried *in vacuo* is dissolved in ether to a lightly yellowish colored solution. After concentration of this latter to about ¾ liter the bases separate in the form of white pure clusters of crystals containing 11¼ to 12 per cent. of nitrogen. The latest precipitates, which occur while the solution is evaporated to a very small volume, are formed by yellowish globules of a smaller percentage of nitrogen (9½ to 10 per cent.); by their recrystallization from ether they can also be transformed into white pure fraction containing 11½ to 12 per cent. of nitrogen. All precipitates are characterized by Keller's iron chlorid reaction. Small fractions of a milligram give, when dissolved in glacial acetic acid and after a trace of an iron chlorid solution has been added, a violet to blue zone after the solution has been floated on concentrated sulfuric acid.

*Example 2.*

2 kilos of ergot are coarsely pulverized, mixed with a solution of 200 gr. of crystallized aluminium sulfate in 300 ccm. of water, finely ground, moistened with 1½ liters of benzene and extracted exhaustively with benzene in a percolator. The mass of extraction is then stirred with 4 liters of benzene and in the suspension maintained in movement gaseous ammonia is introduced until the cellulous substance shows a weakly alkaline reaction; the liquid is separated by filtration and suction from the solid residue which is further washed with little portions of benzene until an evaporated sample of the washing liquid does not further show Keller's reaction with iron chlorid. When the extract thus obtained is concentrated at a low temperature to 50-100 ccm. the alkaloid separates for the most part, slighly yellowish colored and containing more than 11 per cent. of nitrogen. The mother-lye, which contains only a very small fraction of the base, is advantageously not worked up, but used directly for the moistening of the ground and acidified ergot of a subsequent operation. The raw base isolated by suction, washed with benzene and dried *in vacuo* is dissolved in a manifold quantity of acetone, the resulting solution filtered off from a small quantity of insoluble flocks and afterward 5 to 10 per cent. water are added thereto, whereby immediately an abundant crystallization of pure alkaloid takes place.

What I claim is:

1. The herein described process for the manufacture of a highly active preparation of ergot, consisting in adding to the drug acid reagents in order to make the valuable basic substances insoluble in solvents for fatty bodies, separating the soluble non-basic substances by an extraction with such a solvent, adding to the mass of extraction alkaline reagents, extracting the alkaloids liberated by these latter, evaporating the extract under a reduced pressure at ordinary temperature, treating the residue with benzin, separating by filtration the raw alkaloids insoluble in benzin and recrystallizing the same from ether.

2. The herein described process for the manufacture of a highly active preparation of ergot, consisting in adding to the drug acid agents in order to make the valuable basic substances insoluble in solvents for fatty bodies, separating the non-basic soluble substances by an exhaustive extraction with such a solvent not mixable with water and boiling at a low temperature, adding to the mass of extraction alkaline reagents, extracting the alkaloids liberated by these latter, concentrating the resulting extract to a little volume in order to produce a separation of alkaloid and recrystallizing the separated alkaloid from an organic solvent mixable with water to which a little quantity of water has been added.

3. The herein described process for the manufacture of a highly active preparation of ergot, consisting in preparing an extract of ergot, treating this extract with acid reagents in presence of natural cellulous substance, separating the non-basic soluble substances by an exhaustive extraction with such a solvent not mixable with water and boiling at a low temperature, adding to the mass of extraction alkaline reagents, extracting the alkaloids liberated by these latter, concentrating the resulting extract to a little volume in order to produce a separation of alkaloid and recrystallizing the separated alkaloid from an organic solvent mixable with water to which a little quantity of water has been added.

4. The herein described process for the manufacture of a highly active preparation of ergot, consisting in adding to the drug acid reagents in order to make the valuable basic substances insoluble in solvents for fatty bodies, separating the non basic soluble substances by an exhaustive extraction with such a solvent not mixable with water and boiling at a low temperature, adding to the mass of extraction alkaline reagents, extracting the alkaloids liberated by these latter, concentrating the resulting extract to a little volume in order to produce a separation of alkaloid, dissolving the separated previously dried raw alkaloid in a manifold quantity of pure acetone and recrystallizing the same by adding 5 to 10 per cent. of water.

In witness whereof I have hereunto signed my name this twentieth day of March, 1919, in the presence of two subscribing witnesses.

ARTHUR STOLL.

Witnesses:
  SCOTT TAGGART,
  AMAND RITTER.